US005896743A

United States Patent [19]

Griffin

[11] Patent Number: 5,896,743

[45] Date of Patent: Apr. 27, 1999

[54] CATALYST MONITOR UTILIZING A LIFETIME TEMPERATURE PROFILE FOR DETERMINING EFFICIENCY

[75] Inventor: Joseph R. Griffin, Penton, Mich.

[73] Assignee: Heraeus Electro-Nite International N.V., Houthalen, Belgium

[21] Appl. No.: 08/881,400

[22] Filed: Jun. 24, 1997

[51] Int. Cl.[6] .................................................. F01N 3/00

[52] U.S. Cl. .............................. 60/274; 60/277; 73/118.1

[58] Field of Search ............................ 60/276, 274, 277; 73/118.1

[56] References Cited

U.S. PATENT DOCUMENTS

| | | | |
|---|---|---|---|
| 5,339,628 | 8/1994 | Maus et al. | 60/277 |
| 5,414,994 | 5/1995 | Cullen et al. | 60/274 |
| 5,428,956 | 7/1995 | Maus et al. | 73/118.1 |
| 5,531,069 | 7/1996 | Katsuhiko . | |
| 5,626,014 | 5/1997 | Hepburn et al. | 60/274 |
| 5,706,652 | 1/1998 | Sultan | 60/276 |
| 5,732,549 | 3/1998 | Treinies et al. | 60/274 |
| 5,752,382 | 5/1998 | Hanafusa et al. | 60/277 |

FOREIGN PATENT DOCUMENTS

| | | |
|---|---|---|
| 2304464 | 1/1973 | Germany . |
| 587836-A1 | 3/1994 | Germany . |
| 03 121240 | 5/1991 | Japan . |
| WO 95/17588 | 6/1995 | WIPO . |

OTHER PUBLICATIONS

"Methods for Monitoring and Diagnosing the Efficiency of Catalytic Converters," M. Sideris, May, 1998; Elsevier Science B.V., The Netherlands, pp. 277–281.

*Primary Examiner*—Thomas E. Denion

*Attorney, Agent, or Firm*—Panitch Schwarze Jacobs & Nadel, P.C.

[57] ABSTRACT

In an internal combustion engine, a catalyst monitor includes a resistive type oxygen sensor positioned between the engine and the catalyst and a temperature sensor positioned proximate to the catalyst. The oxygen sensor measures an oxygen concentration of the engine emissions and the temperature sensor monitors a temperature of the catalyst and detects a light off time of the catalyst. The magnitude of resistance of the oxygen sensor is measured and compared to a predetermined threshold level. The catalyst light off time is compared to a predetermined time value. In addition, a lifetime temperature profile of the catalyst is generated and compared to a predetermined threshold temperature level. The results of the comparisons are used to establish whether the catalyst is operating efficiently.

24 Claims, 6 Drawing Sheets

CATALYST MONITOR UTILIZING A LIFETIME TEMPERATURE PROFILE FOR DETERMINING EFFICIENCY

BACKGROUND OF THE INVENTION

The present invention relates to a method of monitoring a catalyst and an apparatus therefor. More particularly, the present invention is directed to a method of predicting the efficiency of an automotive catalyst based on a catalyst lifetime temperature profile and a contamination measurement.

The efficiency of automotive catalysts must be known in order to indicate when a given vehicle exceeds allowable exhaust emission levels. As regulations become more stringent, reducing allowable exhaust emission levels, the accuracy for determining catalyst efficiency must be improved. At present, catalyst efficiency is measured using two oxygen sensors positioned before and after the catalyst. The difference in the oxygen content of the exhaust gas is then measured to determine the oxygen storage capacity of the catalyst, which is related to catalyst efficiency. Although this system is presently sufficient to measure catalyst efficiency, more stringent emissions standards will require improved sensor resolution and improved system accuracy.

A catalyst is a passive device which could function indefinitely under ideal conditions. The catalyst has two primary aging factors, thermal aging and contamination aging. Additionally, the lambda control frequency of the motor management system must be maintained above a threshold level in order to provide the optimum efficiency of the catalyst. If the parameters of temperature, time, lambda, and contamination are recorded over the life of the catalyst, the efficiency of the catalyst can be predicted with very high accuracy.

The present invention recognizes that the loss of efficiency in a catalyst is caused primarily by thermal aging and poisoning of the catalyst by exhaust contamination. With the use of an accurate exhaust gas temperature sensor, the time that the catalyst is operated above a predetermined threshold temperature may be recorded and weighted according to how far and how long above the threshold temperature the catalyst operates. This measurement may be used to create a lifetime temperature profile. Based on the known thermal aging characteristic of the catalyst, the catalyst efficiency can be accurately determined by comparing the measured lifetime temperature profile of the catalyst to its known thermal aging characteristic.

BRIEF SUMMARY OF THE INVENTION

Briefly stated, the present invention is a monitor for measuring the efficiency of a catalyst located in an exhaust path of an internal combustion engine. In a first preferred embodiment, the monitor comprises a resistive type oxygen sensor positioned in the exhaust path between the engine and the catalyst, the oxygen sensor detecting oxygen concentration of engine emissions. A temperature sensor is positioned proximate to the catalyst for generally, continuously monitoring catalyst temperature. Means are provided for receiving the catalyst temperature from the temperature sensor and generating a lifetime temperature profile and a catalyst light off time. A first comparator compares a magnitude of the sensor resistance to a predetermined threshold level. A second comparator receives the catalyst light off time and compares the catalyst light off time to a predetermined light off time value. A third comparator receives the lifetime temperature profile and compares the temperature profile to a predetermined temperature profile threshold limit.

In a second preferred embodiment, the monitor comprises a resistive type oxygen sensor positioned in the exhaust path between the engine and the catalyst, and a temperature sensor positioned proximate to the catalyst for monitoring catalyst temperature. The oxygen sensor detects oxygen concentration of engine emissions and measures air/fuel (A/F) control frequency. A first comparator receives the A/F control frequency and compares the A/F control frequency to a predetermined A/F control frequency threshold limit. Means are provided which are connected to the temperature sensor for generating a lifetime temperature profile and a catalyst light off time. A second comparator receives the determined catalyst light off time and compares it to a predetermined time value and a third comparator receives the lifetime temperature profile and compares it with a predetermined temperature profile threshold limit.

In a third embodiment, the monitor comprises a first potentiometric type oxygen sensor positioned in the exhaust path between the engine and the catalyst and a temperature sensor positioned proximate to the catalyst. The first oxygen sensor provides a first catalyst contamination measurement. The temperature sensor monitors catalyst temperature. Means are provided for receiving the catalyst temperature and generating a lifetime temperature profile and a catalyst light off time. A second potentiometric type oxygen sensor is positioned in the exhaust path downstream from the catalyst. The second oxygen sensor provides a second catalyst contamination measurement and generates an air/fuel (A/F) control signal. A first comparator receives the generated catalyst light off time and compares it to a predetermined time value. A second comparator receives the lifetime temperature profile and compares it with a predetermined temperature profile threshold limit. A third comparator receives the A/F control signal and compares it to a predetermined A/F control signal threshold limit.

The present invention also provides a method of measuring the efficiency of a catalyst located in the exhaust path of an internal combustion engine. In a first preferred embodiment, the method comprises the steps of:

measuring a concentration of engine emissions with an oxygen sensor positioned in the exhaust path between the engine and the catalyst;

measuring a magnitude of the resistance of the oxygen sensor;

comparing the magnitude of the resistance to a predetermined threshold limit;

detecting a temperature of the catalyst with a temperature sensor positioned proximate to the catalyst;

determining a light off time of the catalyst with the detected catalyst temperature;

comparing the detected light off time with a predetermined light off time limit;

generating a lifetime temperature profile with the measured catalyst temperature; and comparing the lifetime temperature profile with a predetermined temperature profile threshold limit.

In a second preferred embodiment, the method comprises the steps of:

measuring a concentration of engine emissions with an oxygen sensor positioned in the exhaust path between the engine and the catalyst;

monitoring air/fuel (A/F) control frequency of the oxygen sensor;

comparing the monitored A/F control frequency to a predetermined A/F control frequency threshold limit;

detecting a temperature of the catalyst with a temperature sensor positioned proximate to the catalyst;

determining a light off time of the catalyst using the detected catalyst temperature;

comparing the detected light off time with a predetermined light off time limit;

generating a lifetime temperature profile with the measured catalyst temperature; and comparing the lifetime temperature profile with a predetermined temperature profile threshold limit.

In a third embodiment, the method comprises the steps of:

detecting catalyst temperature with a temperature sensor positioned proximate to the catalyst;

determining a catalyst light off time using the detected catalyst temperature;

comparing the determined light off time with a predetermined light off time limit;

generating a lifetime temperature profile with the detected catalyst temperature;

comparing the lifetime temperature profile with a predetermined temperature profile threshold limit;

measuring an air/fuel (A/F) control signal generated by a potentiometric type oxygen sensor positioned in the exhaust path downstream from the catalyst; and comparing the A/F control signal to a predetermined A/F control signal threshold limit.

Finally, the present invention further provides a method of measuring the efficiency of a catalyst located in the exhaust path of an internal combustion engine comprising the steps of monitoring a temperature of the catalyst with a temperature sensor, generating a lifetime temperature profile of the catalyst, and comparing the lifetime temperature profile with a predetermined temperature profile threshold limit.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
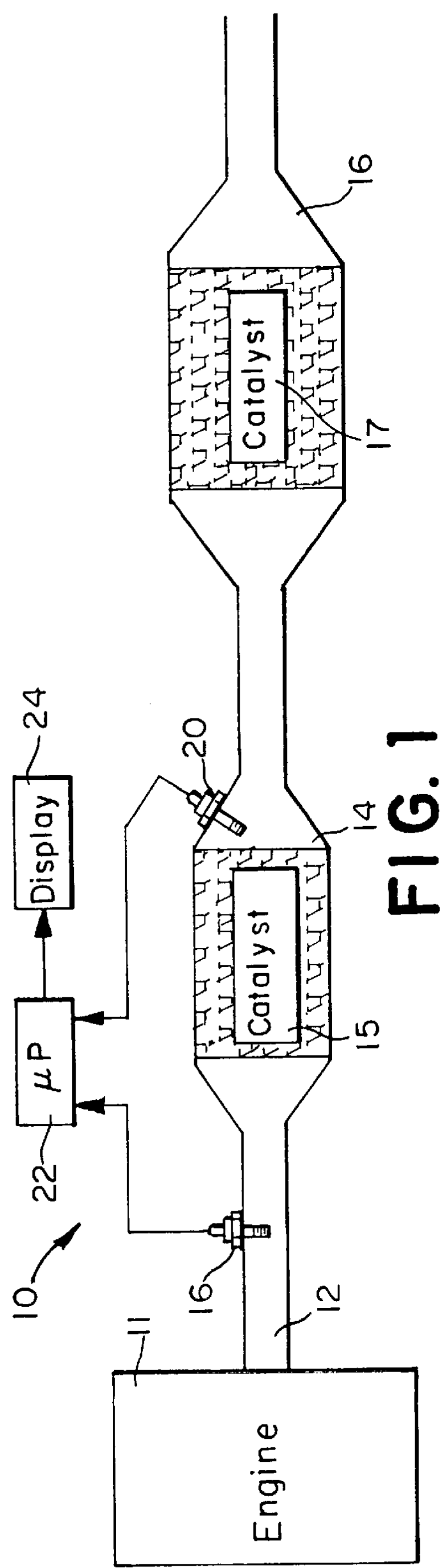
FIG. 1 is schematic block diagram of a first preferred embodiment of a catalyst monitor in accordance with the present invention.

In the drawings, like numerals are used to indicate like elements throughout. The present invention provides an accurate means for predicting catalyst performance by measuring the temperature at which the catalyst operates and generating a catalyst lifetime temperature profile. The catalyst temperature profile is used to predict when the catalyst will cease to function efficiently. Once the catalyst temperature profile exceeds a predetermined threshold level, an indicator is activated to indicate that the catalyst is no longer operating at a predetermined efficiency level. The temperature profile prediction method may also be supplemented using additional measured data, such as catalyst light off time, air/fuel (A/F) control frequency, exhaust contamination measurements, and other component diagnostic measurements. As used herein, the catalyst light off time refers to a length of time between the engine ignition crank and catalyst temperature reaching about 300° C.

Referring now to FIG. 1, a schematic block diagram of a first preferred embodiment of a catalyst monitor 10 for monitoring the performance and measuring the efficiency of a catalyst located in the exhaust path of an internal combustion engine 11 is shown. The engine 11 and the invention are described herein as relating to automobiles. However, it will be apparent to those of ordinary skill in the art that the present invention is not limited to use with automobiles, but may be used with other vehicles and/or engine driven machines. The engine 11 has an exhaust path 12 which generally includes a first catalytic converter 14 having a catalyst 15 located in the exhaust manifold in the engine compartment and a second catalytic converter 16 having a second catalyst 17 located under the floor of the automobile.

The catalyst monitor 10 includes a resistive type oxygen sensor 18 positioned in the exhaust path 12 between the engine 11 and the first catalyst 15 and a temperature sensor 20 positioned proximate to the first catalyst 15. Each of the sensors 18, 20 is preferably connected directly or indirectly to a microprocessor 22 or other computer. The microprocessor 22 may be a separate processing element for performing calculations and functions, as described below, or a part of the engine control unit (not shown). The microprocessor 22 is preferably of a type well known and generally commercially available. Such microprocessors used in automobiles are well known and further description thereof is not necessary for a complete understanding of the invention. Suffice it to say that the microprocessor is able to accept data from an associated memory (not shown) and the sensors 18, 20, perform mathematical calculations, and store the resulting data in the associated memory.

The catalyst monitor 10 may further include a display or indicator 24, known as a “malfunction indicator light” or “MIL”, connected to the microprocessor 22 for indicating that the first catalyst 14 is functioning below a predetermined threshold operating level. The indicator 24 is preferably a light or LED on the automobile dashboard which, when lit or illuminated, informs the vehicle operator that the catalyst 15 is no longer functioning efficiently and may need to be replaced.

The oxygen sensor 18 is provided for measuring sensor resistance, which is a function of the oxygen concentration of engine emissions and air/fuel (A/F) ratio (lambda). The poisoning of the catalyst 15 can be measured via changes in the characteristic of the oxygen sensor 18 monitoring the catalyst 15. This contamination effect can be related to several characteristics, including increased response time of the oxygen sensor 18 to changes in the lambda value, magnitude of the lambda offset between a pre-catalyst oxygen sensor and a post-catalyst oxygen sensor, and the increased rich resistance of a resistive type oxygen sensor. The oxygen sensor 18 preferably provides a sensor resistance signal and a heater resistance signal. Such resistive type oxygen sensors are known by those of ordinary skill in the art and are generally commercially available. For instance, the Heraeus Lambda probe VR, available from Heraeus Sensor-Nite, is a suitable sensor.

According to the present invention, the efficiency of the catalyst 15 is determined and a catalyst malfunction indicator light (i.e. the display 24) is activated based on catalyst light off time, lifetime temperature profile, and contamination measurement derived from the oxygen sensor 18 (including lambda control frequency). If the catalyst contamination measurement is derived from the increased resistance and response time using a resistive type oxygen sensor, the lambda control function and the on board diagnostic functions for the catalyst 15 and the oxygen sensor 18 can be achieved with one oxygen sensor and one exhaust gas temperature sensor, thereby optimizing the cost to benefit ratio of the motor management system. The function of using a post catalyst oxygen sensor to trim the control point of the precatalyst oxygen sensor is not required with a resistive type oxygen sensor. This is due to the volume resistive effect of the resistive oxygen sensor which provides a stable lambda control point even though contaminants shift the resistance characteristic upward.

Figure 2:
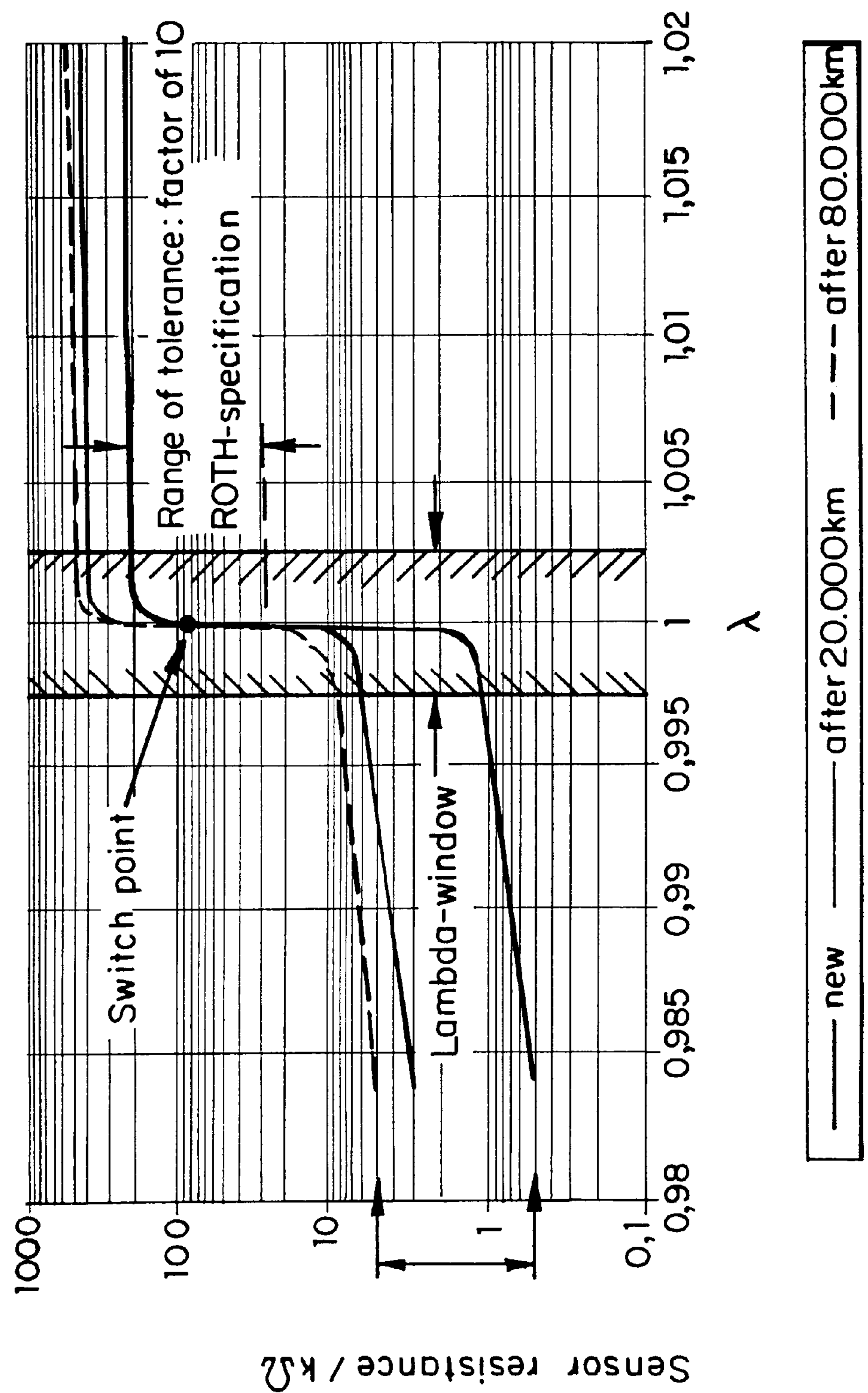
FIG. 2 is a graph of oxygen sensor resistance versus lambda.

Referring to FIG. 2, a catalyst contamination measurement may be calculated using the oxygen sensor 18. Exhaust gas contamination effects the catalyst in a manner which is similar to the way it effects the oxygen sensor 18. That is, exhaust gas contamination blocks the active catalytic sites in their coating layers. As a result, the characteristic change in the oxygen sensor can be related to the contamination level in the catalyst. In FIG. 2, the graph depicts sensor resistance on the vertical axis and lambda resistance on the horizontal axis. Exhaust gas contamination causes the sensor rich characteristic to shift up in the vertical direction. The magnitude of the shift is related to exhaust gas contamination of the catalyst 15 and the oxygen sensor 18.

Referring again to FIG. 1, the temperature sensor 20 is provided for monitoring the temperature of the catalyst 15. The temperature sensor 20 allows the light off time to be detected. For instance, when the automobile ignition is cranked, a timer (not shown) may be initiated. Then, when the catalyst 15 temperature reaches about 300° C., as measured by the temperature sensor 20, the timer is stopped and the value is either used for performing further calculations, as described below, or stored in the associated memory.

Preferably, the temperature sensor 20 generally, continuously monitors the temperature of the first catalyst 15. A suitable temperature sensor is the Heraeus Pt 100 available from Heraeus Sensor-Nite, which provides an electrical signal indicative of the catalyst temperature. Although the oxygen sensor 18 and the temperature sensor 20 are shown monitoring the first catalytic converter 14, it will be understood by those of ordinary skill in the art that the sensors 18, 20 could be positioned to monitor the second catalytic converter 16. Further, multiple temperature and oxygen sensors could be used to provide more data, which data could be analyzed according to the novel methods of the present invention.

Preferably the microprocessor 22 receives the electrical signals from the oxygen sensor 18 and the temperature sensor 20 and processes the respective signals, as described in more detail hereinafter. However, it will be understood by those of ordinary skill in the art that other electrical circuit elements could be used to perform the calculations described herein. For instance, discrete logic devices, such as counters, timers, and flip-flops could be used.

Figures 3, 4:
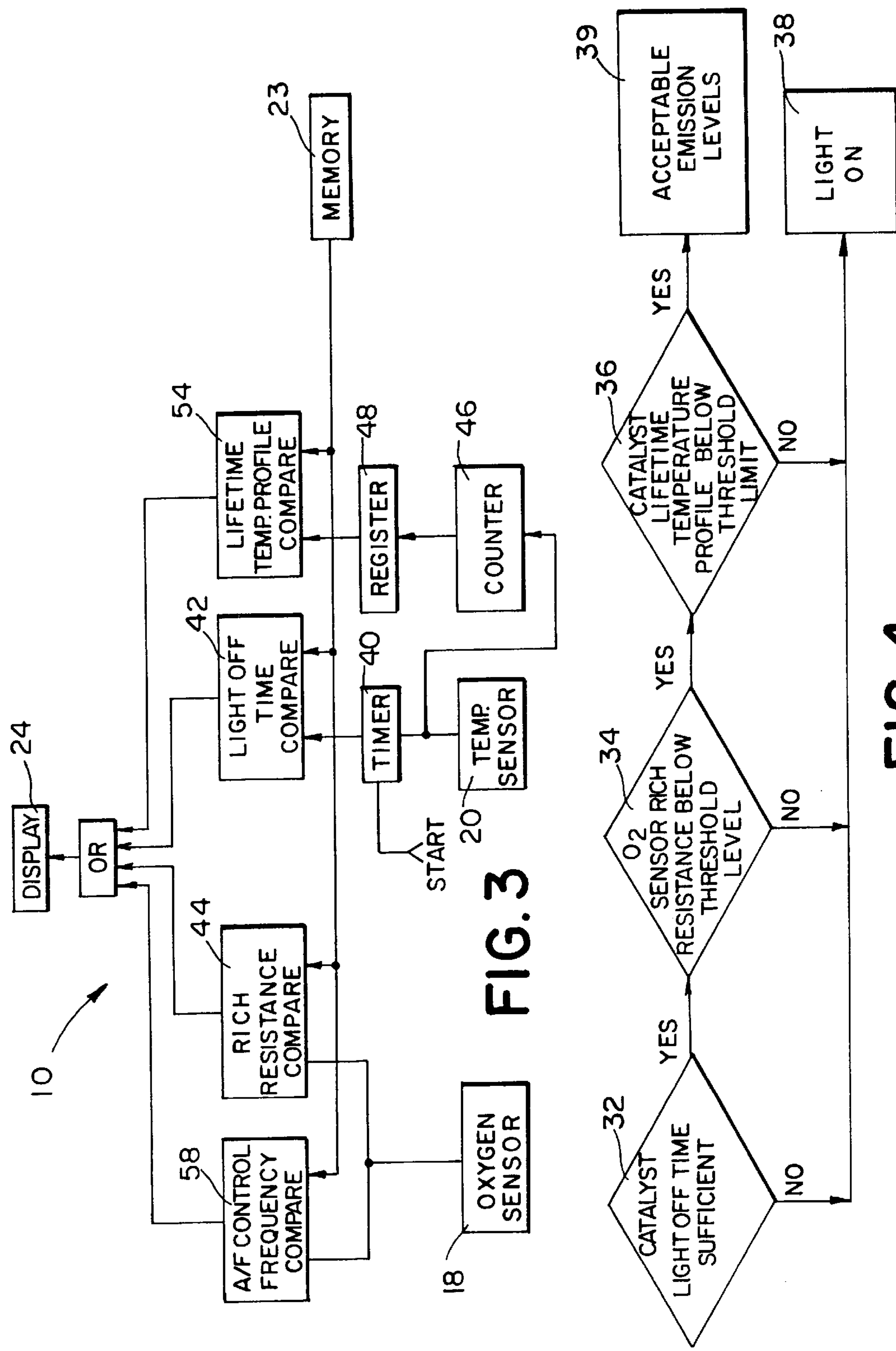
FIG. 3 is more detailed schematic block diagram of the catalyst monitor shown in FIG. 1.
FIG. 4 is a flow diagram of a first method of monitoring catalyst efficiency with the catalyst monitor of FIG. 1.

Referring now to FIGS. 3 and 4, a method of monitoring the catalyst 15 and predicting the operating efficiency of the catalyst 15 are described. FIG. 3 is a simplified block diagram of the catalyst monitor 10 and FIG. 4 is a flowchart of a first preferred method of measuring the efficiency of the first catalyst 15. The method is performed using the afore-described oxygen and temperature sensors 18, 20 and the microprocessor 22. As will be understood by those of ordinary skill in the art, the microprocessor 22 is connected to or includes an associated memory 23 which contains instructions, routines, programs, and space for storing data, which permit the processor 22 to function according to its intended purpose. The associated memory 23 is also used to store parameter data, such as the predetermined threshold values against which the measured values are compared, as described below. The associated memory 23 may comprise RAM and/or ROM, including PROM, EPROM, EEPROM, flash memory, etc.

In a first step 32, the catalyst 15 light off time is detected. As previously discussed, the light off time is the length of time beginning when the engine ignition is cranked to when the catalyst 15 temperature reaches about 300° C. In an emissions test cycle, approximately 80% of the emissions occur during the first 45 seconds. The length of time that a catalyst is inactive reduces the average efficiency of the catalyst. Thus, it is imperative to maintain a consistent and minimized light off time. The threshold value is indicative of a catalyst operating below a desired average efficiency rate.

The discrete measurement of catalyst light off time is preferably measured with the exhaust gas temperature sensor 20 during each cold start and is compared to a threshold time relative to engine coolant temperature at the time of start and the elapsed time since the engine was last operated. The catalyst light off time is determined by starting a timer 40 (either a software timer or a hardware timer) at the time the engine ignition is cranked, and then stopping the timer 40 when the catalyst 15 temperature reaches about 300° C., as measured by the temperature sensor 20. The timer value is then compared to a predetermined light off threshold value obtained from the memory 23 or stored in a register, for instance using a comparator 42 or by performing a compare function with the microprocessor 22. If the detected catalyst light off time, as determined by the comparator 42, is greater than the predetermined light off threshold value, then the indicator 24 is activated at step 38. A catalyst light off time which exceeds the predetermined threshold value is indicative of a catalyst operating below a desired efficiency rate. In the presently preferred embodiment, the predetermined catalyst light off time threshold value is about 20 seconds (± about 10 seconds).

If the light off time is within acceptable parameters, then step 34 is performed. In step 34, the magnitude of the rich resistance measured by the oxygen sensor 18 is compared to a predetermined threshold limit obtained from the memory 23, using either a second comparator 44 or by executing a compare function within the microprocessor 22. A rich resistance increase from an initial value (i.e. in a new condition) is an indicator of the contamination effect on the catalyst 15 and is measured by the increased voltage drop across the oxygen sensor 18 resistance circuit. That is, the rich resistance relates to an exhaust gas contamination level of the catalyst 15, which reduces the surface area of active catalytic sites in the catalyst 15. A rich resistance which exceeds the predetermined threshold value is indicative of the catalyst 15 operating below a desired efficiency rate. If the magnitude of the measured rich resistance is above the predetermined resistance threshold limit, as determined by the second comparator 44, then the indicator 24 is activated at step 38. In the presently preferred embodiment, the predetermined resistance threshold value is about 20 kohms (±25%).

If the rich resistance is within acceptable parameters, then step 36 is performed. In step 36, a lifetime temperature profile of the catalyst 14 is compared to a predetermined temperature profile threshold limit. The lifetime temperature profile is a measurement of the length of time that the catalyst temperature exceeds a predetermined threshold, as described below, and is generated using the temperature sensor 20 and a counter 46.

Figure 5:
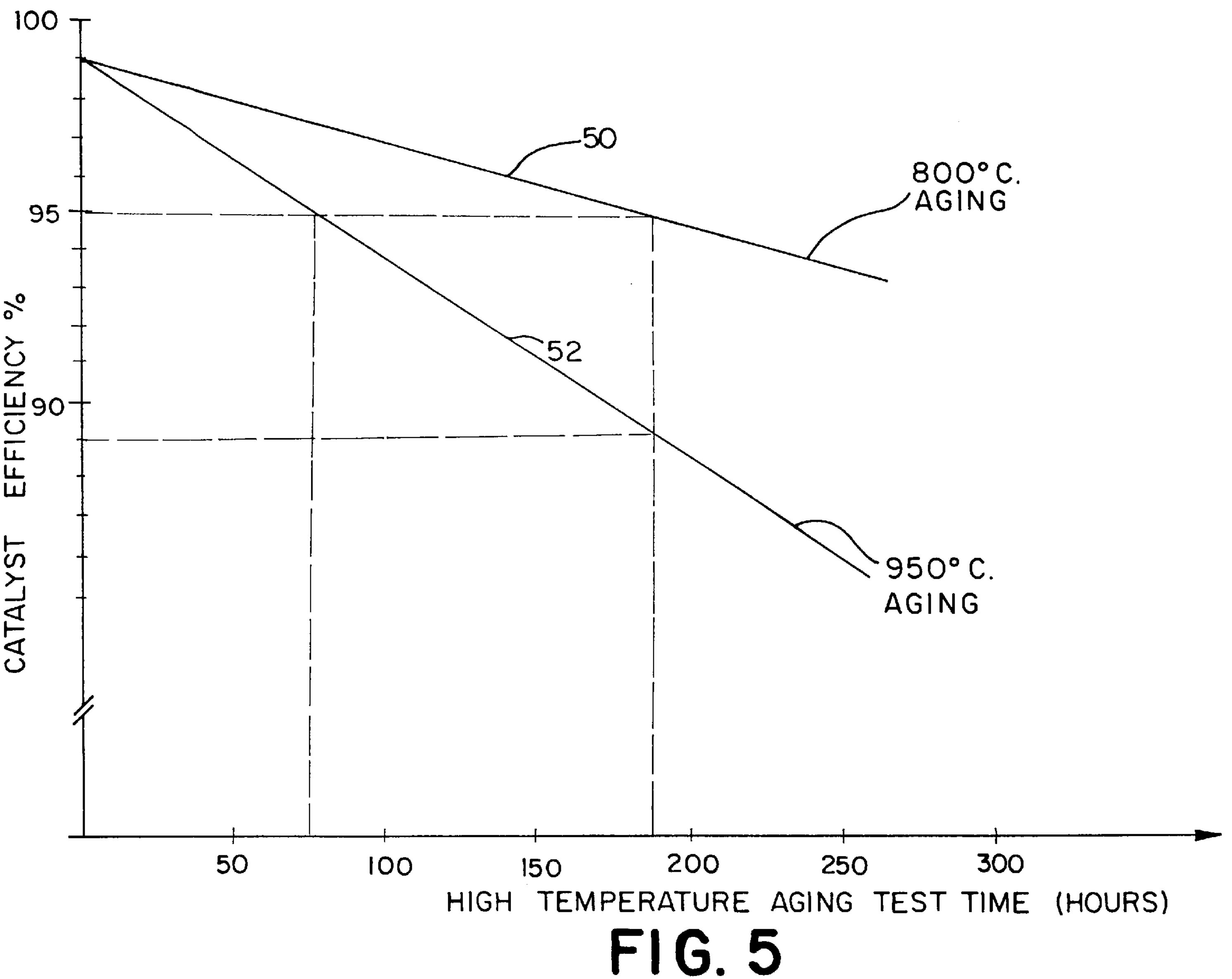
FIG. 5 is a graph of temperature aging test time versus catalyst efficiency.

Referring now to FIG. 5, each type of catalyst has a thermal aging profile which can be used to determine catalyst efficiency. FIG. 5 is a catalyst thermal aging profile, which is a graph plotting catalyst efficiency (%) versus high temperature aging time (hours). The first graph line 50 represents a catalyst operating at 800° C. and the second graph line 52 represents a catalyst operating at 950° C. As is readily apparent in FIG. 5, catalyst efficiency decreases more rapidly when the catalyst is operated at a higher temperatures over time. For instance, after about 190 hours of testing, the catalyst tested at 800° C. (line 50) is operating at about 95% efficiency, while the catalyst tested at 950° C. (line 52) is operating at only about 87% efficiency. Of course, it will be understood by those of ordinary skill in the art that the predetermined lifetime temperature profile threshold limit will vary depending upon desired/required efficiency and the composition of the catalyst.

Figure 6:
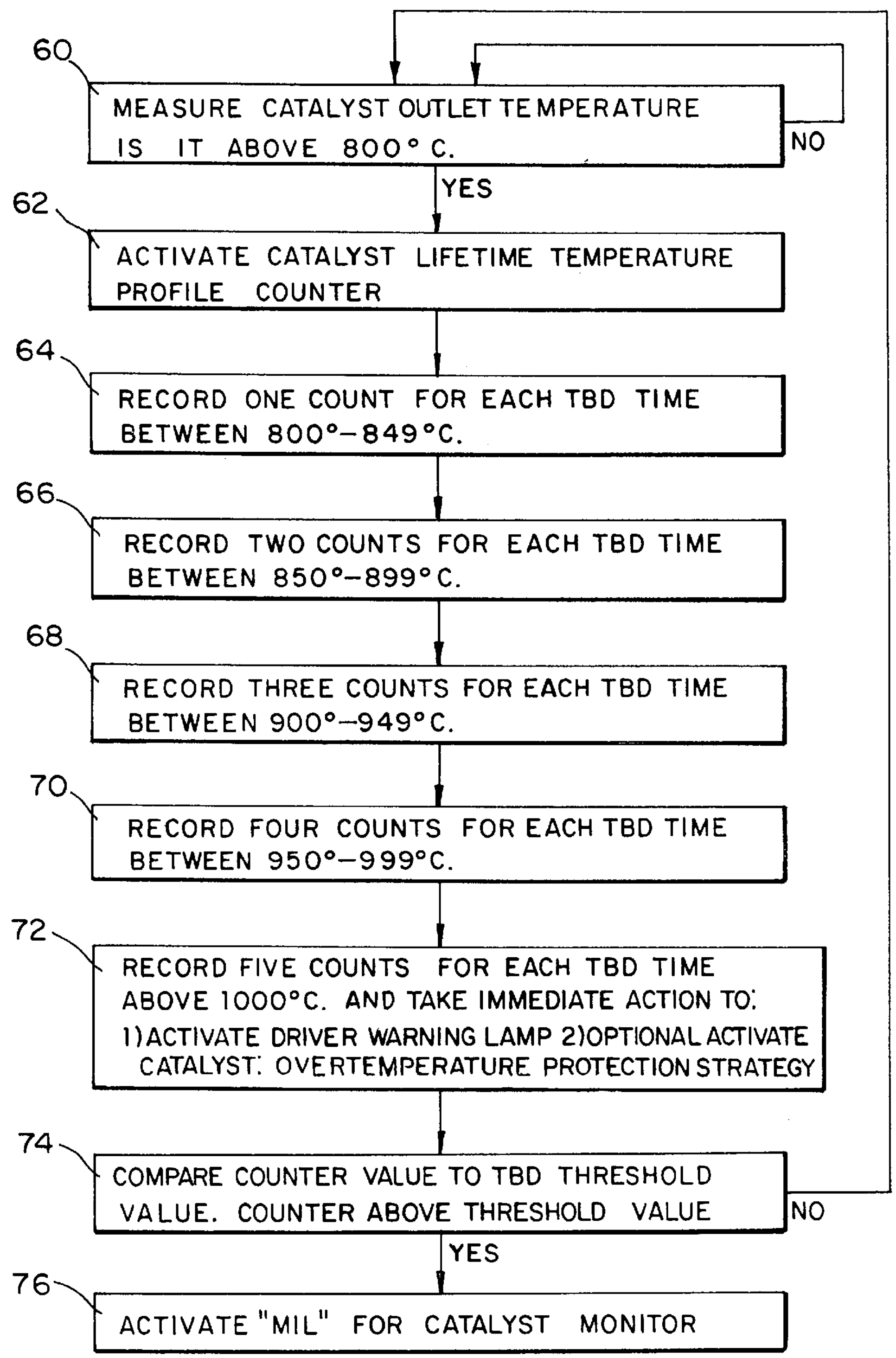
FIG. 6 is a flow diagram of a procedure for generating a catalyst lifetime temperature profile.

Referring now to FIG. 6, a routine for generating a catalyst lifetime temperature profile is shown. Beginning with step 60, the catalyst temperature is generally continually measured with the temperature sensor 20 and generally continually compared to a first predetermined temperature value. In the present example, the first predetermined temperature value is about 800° C. If the temperature is greater than the first predetermined temperature value, then execution proceeds with step 62. Otherwise, the routine continues to monitor the temperature and compare the temperature to the first predetermined temperature value. At step 62, a temperature profile counter 46 is enabled or activated. That is, profile counter logic is enabled such that a cumulative stored value may be updated (see FIG. 3). The temperature is then evaluated, and based on the magnitude of the temperature for a predetermined time unit, the counter 46 is incremented. For instance, if the temperature is within a first predetermined range (e.g. 800–849° C.) for a predetermined time unit, then the counter 46 is incremented by one (step 64). If the temperature is within a second predetermined range (e.g. 850–899° C.) for a predetermined time unit, then the counter 46 is incremented by two (step 66). If the temperature is within a third predetermined range (e.g. 900–949° C.) for a predetermined time unit, then the counter 46 is incremented by three (step 68). If the temperature is within a fourth predetermined range (e.g. 950–999° C.) for a predetermined time unit, then the counter 46 is incremented by four (step 70). If the temperature is greater than an upper limit (e.g. 1000° C.) for a predetermined time unit, then the counter 46 is incremented by five (step 72). In addition, at step 72, the display 24 (FIGS. 1 and 3) may also be activated to indicate that the catalyst 15 is operating at an unsafe temperature. At step 72, the system 10 may also optionally activate a signal to initiate a catalyst over temperature protection strategy. At step 74, the current counter value is compared to a lifetime temperature profile threshold value. If the counter value is greater than the threshold value, the display 24 is activated (step 74). Otherwise, the routine loops back to step 60. The routine is executed generally continuously, with the counter 46 being incremented and the current counter value being updated once for every predetermined unit of time. For instance, in the presently preferred embodiment, the counter 46 is updated once per minute. It will be understood by those of ordinary skill in the art that the resolution of the temperature profile may be modified by changing the temperature ranges in which the counter 46 is incremented, and/or by having more or fewer temperature ranges, or by changing the time unit.

Referring again to FIGS. 3 and 4, a lifetime temperature profile which exceeds the predetermined threshold value is indicative of a catalyst operating below a desired efficiency rate. Step 36 compares the lifetime temperature profile of the catalyst 15 to a predetermined temperature profile threshold limit. The lifetime temperature profile is generated using a counter 46, as previously discussed. The current value of the counter 46 is stored in a register 48. The current value stored in the register 48 is compared to the predetermined lifetime threshold value using a third comparator 54. If the value stored in the register 48 is greater than the predetermined lifetime temperature profile threshold limit, then the indicator 24 is activated at step 38. Otherwise, it is determined that the catalyst 15 is operating efficiently, as indicated at step 39.

Figure 7:
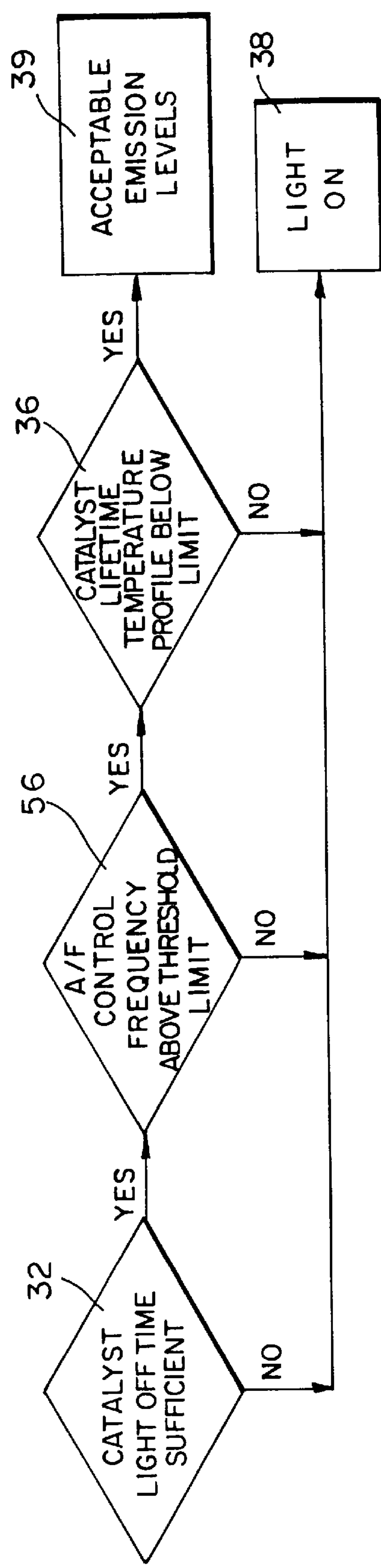
FIG. 7 is a flow diagram of a second method of monitoring catalyst efficiency with the catalyst monitor of FIG. 1.

Referring now to FIG. 7, an alternative embodiment of monitoring the efficiency of the catalyst 15 is shown. This alternative embodiment is similar to the embodiment described with reference to FIG. 4, and includes the steps of monitoring the catalyst light off time (step 32) and generating a catalyst lifetime temperature profile (step 36). However, a new step of monitoring the A/F control frequency, step 56, is substituted for the step of monitoring the rich resistance of the oxygen sensor 18 (step 34).

In step 56, the A/F control frequency of the catalyst 15 is monitored using the oxygen sensor 18. The A/F control frequency is a useful measure of catalyst efficiency because A/F control frequency has a direct effect on catalyst efficiency due to breakthrough of larger than desired volumes of rich or lean exhaust gas. In addition, the A/F control frequency at a given engine speed/load point is indicative of the exhaust contamination level in the catalyst, due to exhaust contamination slowing the response time of the oxygen sensor to changes in the A/F value. Contaminants that degrade the catalyst also degrade the oxygen sensor.

Thus, if in step 32 the light off time is determined to be within acceptable parameters, step 56 is performed. In step 56, the A/F control frequency measured by the oxygen sensor 18 is compared to a predetermined A/F control frequency threshold limit obtained from the memory 23, using a comparator 58 (FIG. 3). As discussed above, an increase in the A/F control frequency is an indicator of the contamination effect on the catalyst 15. If the magnitude of the measured A/F control frequency measured is above the predetermined A/F control frequency threshold limit, as determined by the comparator 58, then the indicator 24 is activated at step 38. In the presently preferred embodiment, the predetermined A/F control frequency threshold limit is about 3 Hz. However, as will be understood by those of ordinary skill in the art, this value is very application specific and depends upon engine operating point during measurement.

According to the present invention, the efficiency of the catalyst 15 may also be measured by combining the two aforedescribed methods. That is, a catalyst monitor could determine catalyst efficiency by monitoring catalyst light off time (step 32), monitoring the rich resistance (step 34), generating a catalyst lifetime temperature profile (step 36), and monitoring A/F control frequency (step 56). Further, it will be understood by those of ordinary skill in the art that all of the steps, or only a subset of the steps may be performed in order to predicate catalyst efficiency.

Figure 8:
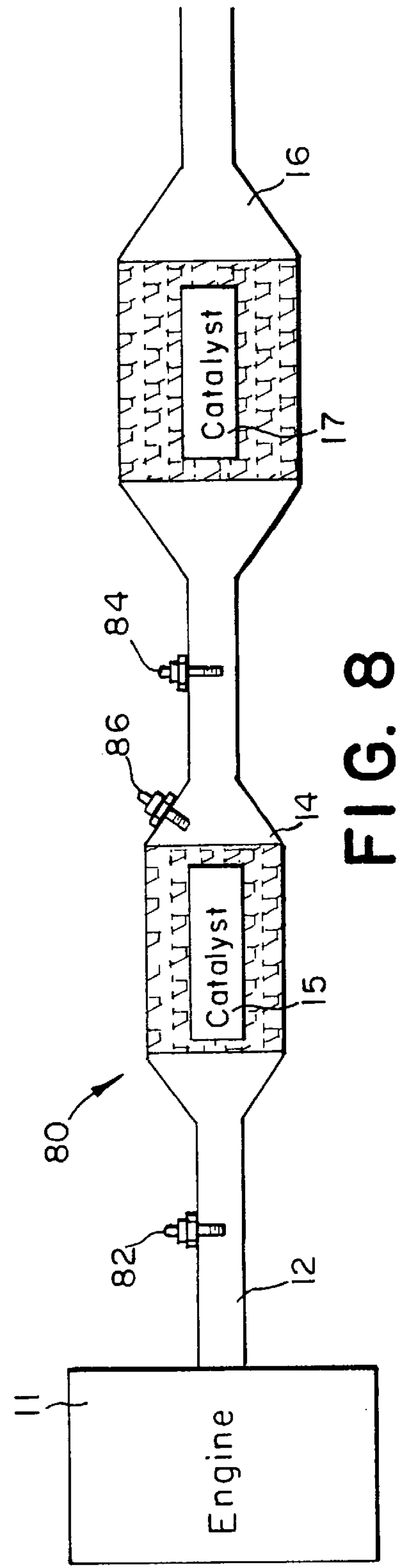
FIG. 8 is a schematic block diagram of a second preferred embodiment of a catalyst monitor in accordance with the present invention.

Referring now to FIG. 8, a schematic block diagram of a portion of a second catalyst monitor 80 is shown. The catalyst monitor 80 is located in the exhaust path 12 of an internal combustion engine 11 and preferably monitors the efficiency of the catalyst 15 of the first catalytic converter 14. The catalyst monitor 80 includes a first oxygen sensor 82 located upstream from the catalyst 15, a second oxygen sensor 84 located downstream from the catalyst 15, and a temperature sensor 86 positioned proximate to the catalyst 15. Each of the sensors 82, 84, 86 is preferably connected to the microprocessor 22 (see FIG. 1), which processes the data received from each of the sensors 82, 84, 86. As before, the microprocessor 22 may be part of an engine control unit or a separate processing element. Further, other electronic devices could be substituted for the microprocessor 22, such as a digital signal processor or discrete logic, as is known to those of ordinary skill in the art without departing from the scope of the invention. The microprocessor 22 is preferably connected to or includes an associated memory device, such as a RAM and/or a ROM (not shown), which store programs and data. The catalyst monitor 80 is also preferably connected to the display or indicator 24 (FIG. 1), for displaying information associated with the catalyst 15, such as a malfunction.

The first and second oxygen sensors 82, 84 are preferably potentiometric type oxygen sensors. The first oxygen sensor 82 provides a primary A/F control signal and the second oxygen sensor 84 provides a secondary A/F control signal. In addition, each oxygen sensor 82, 84 provides a catalyst contamination measurement signal. Such potentiometric type oxygen sensors are known by those of ordinary skill in the art and are generally commercially available. For instance, the Heraeus Lambda Probe Z, available from Heraeus Sensor-Nite, is a suitable potentiometric type sensor.

Potentiometric sensors, such as those based on a solid zirconia electrolyte, produce a 0–1 volt signal due to a potential difference caused by a lower oxygen partial pressure on an exhaust side electrode relative to an air reference side of the electrode of the sensor. In contrast, resistive type sensors, such as a sensor based on the volume resistive material strontium titanate, create a step change in electrical resistance (conductivity) with versus without the presence of oxygen. In the present embodiment, a potentiometric type sensor is preferred to take advantage of the existence of a two potentiometric sensor secondary A/F control strategy and related control signal.

The temperature sensor 86 preferably generally continuously monitors the temperature of the catalyst 15 and provides a temperature signal to the microprocessor 22. The temperature signal may be used to detect catalyst light off time and to generate a catalyst lifetime temperature profile, as previously described.

Figure 9:
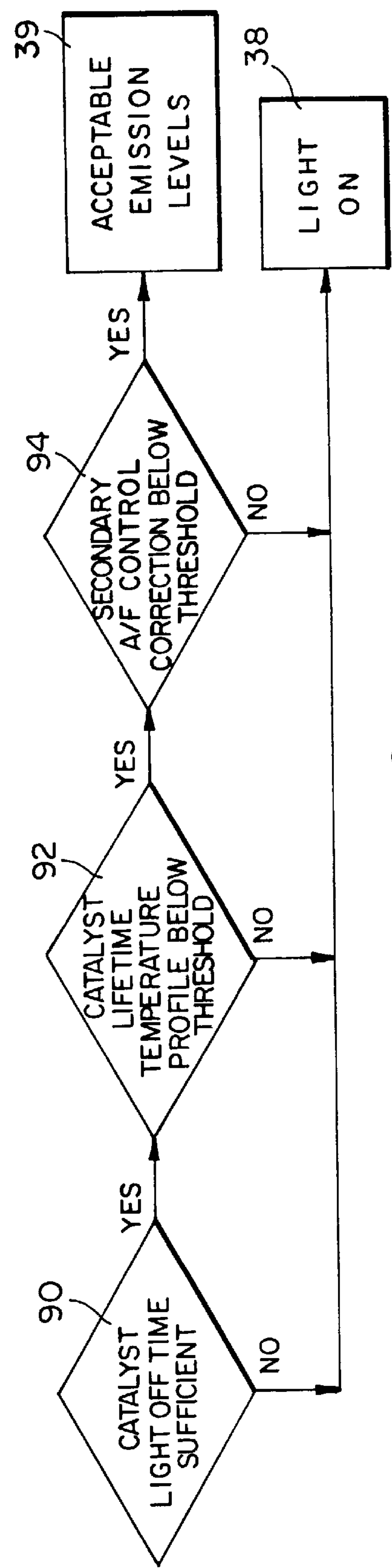
FIG. 9 is a flow diagram of an alternative method of monitoring catalyst efficiency with the catalyst monitor of FIG. 8.

Referring now to FIG. 9, a method of measuring the efficiency of the catalyst 15 using the monitor 80 is shown. The method monitors catalyst light off time, catalyst lifetime temperature profile, and a secondary A/F control signal to measure/predict the catalyst 15 efficiency. Beginning with step 90, the catalyst 15 light off time is detected. The light off time is preferably measured with the temperature sensor 86 during each cold start and is compared to a threshold time relative to engine coolant temperature at the time of start and the elapsed time since the engine 11 was last operated. If the detected catalyst light off time is greater than the predetermined light off threshold value, then the indicator 24 is activated at step 38.

If the light off time is within acceptable parameters, then the lifetime temperature profile is checked at step 92. The lifetime temperature profile is compared to a predetermined threshold limit. If the lifetime temperature profile is greater than the predetermined lifetime temperature profile threshold limit, then the indicator 24 is activated at step 38.

If the lifetime temperature profile is not greater than the lifetime temperature profile threshold limit, then the secondary A/F control signal generated by the second oxygen sensor 84 is compared to a predetermined secondary A/F control threshold limit. If the secondary A/F control signal is greater than the predetermined secondary A/F control threshold limit, then the light is turned on at step 38. Otherwise, it is determined that the catalyst 15 is operating within specified efficiency parameters, as indicated at step 39.

It will be apparent to those of ordinary skill in the art that a modification of the methods and apparatus described herein can also be used to provide the catalyst monitor function on diesel engines and lean burn gasoline engine applications. Further, it will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A monitor for measuring the efficiency of a catalyst located in an exhaust path of an internal combustion engine, the monitor comprising:

a resistive type oxygen sensor positioned in the exhaust path between the engine and the catalyst, the oxygen sensor detecting oxygen concentration of engine emissions;

a temperature sensor positioned proximate to the catalyst for generally, continuously monitoring catalyst temperature;

means for receiving the catalyst temperature from the temperature sensor and generating a lifetime temperature profile and a catalyst light off time;

a first comparator for comparing a magnitude of the detected oxygen concentration to a predetermined threshold level;

a second comparator for receiving the catalyst light off time and comparing the catalyst light off time to a predetermined light off time value; and a third comparator for receiving the lifetime temperature profile and comparing the temperature profile to a predetermined temperature profile threshold limit.

2. The monitor according to claim 1 further comprising an indicator connected to at least one of the first, second and third comparators for indicating that the catalyst is functioning below a predetermined threshold operating level.

3. The monitor according to claim 1 further comprising means for monitoring an air/fuel (A/F) control frequency of the oxygen sensor; and a fourth comparator for comparing the measured A/F control frequency to a predetermined A/F control frequency threshold limit.

4. The monitor according to claim 3 further comprising an indicator connected to at least one of the first, second, third and fourth comparators.

5. The monitor according to claim 3 wherein the lifetime temperature profile generating means comprises a counter which is incremented for each predetermined unit of time that the catalyst temperature is above a predetermined temperature limit.

6. The monitor according to claim 5 wherein the unit of time is about one minute and the predetermined temperature limit is about 800° C.

7. The monitor according to claim 5 wherein the counter is incremented by one for each predetermined unit of time the catalyst temperature is within a first predetermined temperature range.

8. The monitor according to claim 7 wherein the counter is incremented by two for each predetermined unit of time the catalyst temperature is within a second predetermined temperature range.

9. The monitor according to claim 8 wherein the counter is incremented by three for each predetermined unit of time the catalyst temperature is within a third predetermined temperature range.

10. The monitor according to claim 5 wherein the third comparator compares the counter value to the predetermined temperature profile threshold limit.

11. A monitor for measuring the efficiency of a catalyst located in an exhaust path of an internal combustion engine, the monitor comprising:

a resistive type oxygen sensor positioned in the exhaust path between the engine and the catalyst, the oxygen sensor detecting oxygen concentration of engine emissions;

measuring means receiving the detected oxygen concentration for monitoring air/fuel (A/F) control frequency of the oxygen sensor;

a first comparator for receiving the A/F control frequency and comparing the A/F control frequency to a predetermined A/F control frequency threshold limit;

a temperature sensor positioned proximate to the catalyst for monitoring catalyst temperature;

means connected to the temperature sensor for generating a lifetime temperature profile and a catalyst light off time;

a second comparator for receiving the detected catalyst light off time and comparing the catalyst light off time to a predetermined time value; and a third comparator for receiving the lifetime temperature profile and comparing the lifetime temperature profile with a predetermined temperature profile threshold limit.

12. The monitor according to claim 11 further comprising an indicator connected to at least one of the first, second and third comparators for indicating that the catalyst is functioning below a predetermined threshold operating level.

13. A method of measuring the efficiency of a catalyst located in the exhaust path of an internal combustion engine comprising the steps of:

measuring a concentration of engine emissions with an oxygen sensor positioned in the exhaust path between the engine and the catalyst;

detecting a magnitude of the resistance of the oxygen sensor;

comparing the magnitude of the resistance to a predetermined threshold limit;

detecting a temperature of the catalyst with a temperature sensor positioned proximate to the catalyst;

determining a light off time of the catalyst using the detected catalyst temperature;

comparing the determined light off time with a predetermined light off time limit;

generating a lifetime temperature profile with the measured catalyst temperature; and comparing the lifetime temperature profile with a predetermined temperature profile threshold limit.

14. The method according to claim 13 further comprising the step of generating an indication signal in response to any of the three compared values exceeding its respective limit.

15. The method according to claim 13 further comprising the steps of monitoring an air/fuel (A/F) control frequency of the oxygen sensor; and comparing the A/F control frequency to a predetermined A/F control frequency threshold limit.

16. The method according to claim 15 further comprising the step of generating an indication signal in response to any of the four compared values exceeding its respective limit.

17. A method of measuring the efficiency of a catalyst located in the exhaust path downstream from an internal combustion engine, the method comprising the steps of:

measuring a concentration of engine emissions with an oxygen sensor positioned in the exhaust path between the engine and the catalyst;

monitoring air/fuel (A/F) control frequency of the oxygen sensor;

comparing the monitored A/F control frequency to a predetermined A/F control frequency threshold limit;

detecting a temperature of the catalyst with a temperature sensor positioned proximate to the catalyst;

determining a light off time of the catalyst using the catalyst temperature;

comparing the determined light off time with a predetermined light off time limit;

generating a lifetime temperature profile with the measured catalyst temperature; and comparing the lifetime temperature profile with a predetermined temperature profile threshold limit.

18. The method according to claim 17 further comprising the step of generating an indication signal in response to any of the three compared values exceeding its respective limit.

19. A monitor for measuring the efficiency of a catalyst located in an exhaust path of an internal combustion engine, the monitor comprising:

a first potentiometric type oxygen sensor positioned in the exhaust path between the engine and the catalyst, the first oxygen sensor providing a first catalyst contamination measurement;

a temperature sensor positioned proximate to the catalyst for monitoring catalyst temperature;

means for receiving the catalyst temperature and generating a lifetime temperature profile and a catalyst light off time;

a second potentiometric type oxygen sensor positioned in the exhaust path downstream from the catalyst, the second oxygen sensor providing a second catalyst contamination measurement and generating an air/fuel (A/F) control signal;

a first comparator receiving the detected catalyst light off time and comparing the catalyst light off time to a predetermined time value;

a second comparator receiving the lifetime temperature profile and comparing the lifetime temperature profile with a predetermined temperature profile threshold limit; and a third comparator receiving the A/F control signal and comparing the A/F control signal to a predetermined A/F control signal threshold limit.

20. The monitor according to claim 19 further comprising an indicator connected to at least one of the first, second and third comparators for indicating that the catalyst is functioning below a predetermined threshold operating level.

21. The catalyst monitor according to claim 19 wherein the first, second and third comparators are implemented with a microprocessor.

22. A method of measuring the efficiency of a catalyst located in the exhaust path downstream from an internal combustion engine, the method comprising the steps of:

detecting catalyst temperature with a temperature sensor positioned proximate to the catalyst;

determining a catalyst light off time from the detected catalyst temperature;

comparing the determined light off time with a predetermined light off time limit;

generating a lifetime temperature profile with the detected catalyst temperature;

comparing the lifetime temperature profile with a predetermined temperature profile threshold limit;

measuring an air/fuel (A/F) control signal generated by a potentiometric type oxygen sensor positioned in the exhaust path downstream from the catalyst; and comparing the A/F control signal to a predetermined A/F control signal threshold limit.

23. The method according to claim 22 further comprising the step of generating an indication signal in response to any of the three compared values exceeding its respective limit.

24. A method of measuring the efficiency of a catalyst located in the exhaust path of an internal combustion engine comprising the steps of:

monitoring a temperature of the catalyst with a temperature sensor;

generating a lifetime temperature profile of the catalyst; and comparing the lifetime temperature profile with a predetermined temperature profile threshold limit.

* * * * *